H. Y. NORWOOD.
THERMOMETER.
APPLICATION FILED FEB. 16, 1916.
1,326,957.
Patented Jan. 6, 1920.
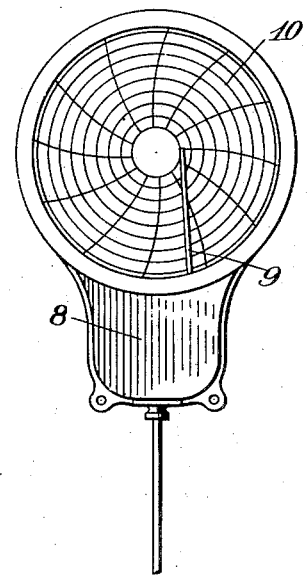
Fig. 1
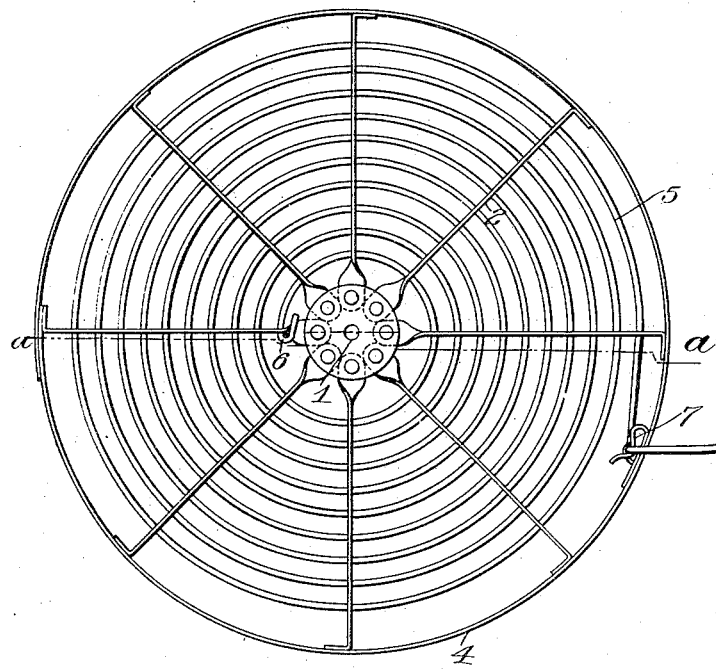
Fig. 2
WITNESSES:
INVENTOR
Harry Y. Norwood
BY
his ATTORNEYS

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

1,326,957.          Specification of Letters Patent.         Patented Jan. 6, 1920.

Application filed February 16, 1916. Serial No. 78,602.

*To all whom it may concern:*

Be it known that I, HARRY Y. NORWOOD, of Rochester, in the county of Monroe and State of New York, have invented certain new and useful Improvements in Thermometers; and I do hereby declare the following to be a full, clear, and exact description of the same, reference being had to the accompanying drawings, forming a part of this specification, and to the reference-numerals marked thereon.

The present invention has to do with recording thermometers or other instruments of a similar nature, embodying a capillary tube for containing a sensitive fluid that is subjected to the atmosphere, or action of heat and cold, and it has for its principal purpose to increase the sensitiveness of instruments of this general class. In a more specific aspect, the invention may be said to reside in exposing within the affected area, a maximum extent of surface for controlling the sensitive fluid, or in other words, in housing the sensitive fluid in such a manner as to distribute it over a comparatively large surface, and in this manner securing a response of maximum quickness and sensitiveness. Further, the invention resides particularly in thermometer structures, and in making provision for so arranging and supporting the capillary tube of a recording thermometer that it may be readily positioned in any one of the different locations where it may be desirable to place it, as for instance, a furnace oven or the like, without being in the way, or otherwise interfering with the operation of the apparatus in which it is installed. To these and other ends the invention consists in certain improvements and combinations of parts, all as will be hereinafter more fully described, the novel features being pointed out in the claims at the end of the specification.

In the drawings:

Figure 1 is a view in elevation, showing the application of my invention to a well known type of recording thermometer, and Fig. 2 is a sectional view on the line *a—a* of Fig. 1.

Similar reference numerals in the several figures indicate the same parts.

The present disclosure illustrates one of various methods of carrying the invention into effect, and is a practical means for obtaining the contemplated result in connection with a thermometer that includes an elongated capillary tube containing the heat sensitive fluid, and adapted to be coiled, wound, or otherwise removably positioned on a support specially constructed for the purpose.

With this in view I employ a support or skeleton frame, preferably of general circular formation, and embodying a central portion or web 1, to which are attached a series of radially disposed arms 2, consisting of flat ribs, which are twisted so as to lie in a plane perpendicular to that which contains the central portion 1. Each of the arms 2 is provided with slots 3 extending from one edge thereof in an inclined direction, to approximately the center of the arm, as shown in Fig. 2, the slots 3 being arranged at different points lengthwise of the arms. Joining the outer ends of the arms 2 is a circular connecting portion in the form of a band or ring 4 which tends to hold them rigid, and afford a stable, and at the same time, a light construction, having a minimum conducting surface. The arrangement just described affords a series of pockets that receive the capillary tube 5, and permit it to be coiled or spirally disposed on the frame in a series of convolutions, starting at the center. The innermost end of the tube 5, which is closed, may be bent at 6 so as to be retained in fixed engagement with the supporting frame, and is thence coiled around, and inserted in the pockets formed by the slots 3, the outer end of the portion of the tube that is located on the frame being held by a suitable spring latch 7.

The instrument illustrated is a thermometer of the usual recording type, embodying a casing 8, containing operating mechanism that is controlled by the expansive fluid within the tube 5. The tube 5 leads from its supporting frame to the casing 8, while 9 is a recording arm coöperating with a record sheet 10.

In the actual operation of a device of this sort, it will be understood that the capillary tube 5 leads from the operating mechanism to the supporting frame on which it is arranged, and the frame can be conveniently positioned in an oven or other restricted area, without in any manner interfering with the operation of the apparatus. The same general result can be obtained without departing from the spirit of my invention, with a support or frame of different character or contour, which would permit of winding or otherwise removably arranging a fluid containing capillary tube thereon.

I claim as my invention:

1. In combination with an elongated flexible tube containing heat sensitive fluid and an indicating instrument to be operated thereby, of a support embodying a series of radially arranged arms, each of which arms is slotted at different points forming recesses along its length to receive said tube when coiled on the support.

2. In combination with an elongated flexible tube containing heat sensitive fluid and an indicating instrument to be operated thereby, of a support embodying a central portion, a series of radially arranged arms connected to the central portion and slotted at different points forming recesses along their length to receive the tube when coiled therein, and a circular connecting portion joining the outer ends of the arms.

HARRY Y. NORWOOD.

Witnesses:
RUSSELL B. GRIFFITH,
H. E. STONEBRAKER.